United States Patent [19]

Burhans

[11] Patent Number: 4,469,730

[45] Date of Patent: Sep. 4, 1984

[54] COMPOSITE BASE STRUCTURE AND END FITTING JOINT AND METHOD

[75] Inventor: Frank M. Burhans, Bellevue, Wash.

[73] Assignee: The Boeing Company, Seattle, Wash.

[21] Appl. No.: 454,603

[22] Filed: Dec. 30, 1982

[51] Int. Cl.³ .............................................. B32B 5/12
[52] U.S. Cl. ..................... 428/36; 156/169;
156/173; 156/175; 156/184; 156/195; 428/105;
428/108; 428/109; 428/110; 428/113; 428/377;
428/408; 428/413
[58] Field of Search ............... 156/169, 173, 175, 189,
156/195; 418/105, 108, 109, 110, 113, 35, 36,
367, 377, 392, 394, 376, 364, 413, 408

[56] References Cited

U.S. PATENT DOCUMENTS

| | | | |
|---|---|---|---|
| 2,837,456 | 6/1958 | Parilla | 154/83 |
| 3,115,271 | 12/1963 | Anderson et al. | 220/83 |
| 3,272,672 | 9/1966 | Lampman et al. | 156/189 |
| 3,850,722 | 11/1974 | Kreft | 156/172 |
| 3,881,973 | 5/1975 | Pinckney | 156/86 |
| 3,992,237 | 11/1976 | Gerholt et al. | 156/86 |
| 4,118,262 | 10/1978 | Abbott | 156/175 |
| 4,172,175 | 10/1979 | Pearson et al. | 428/377 |
| 4,187,135 | 2/1980 | Yates et al. | 156/187 |
| 4,211,589 | 7/1980 | Fisher et al. | 156/73.5 |
| 4,234,368 | 11/1980 | Schwarz | 156/91 |
| 4,236,386 | 12/1980 | Yates et al. | 64/1 S |
| 4,238,540 | 12/1980 | Yates et al. | 428/36 |
| 4,260,332 | 4/1981 | Weingart et al. | 416/226 |
| 4,283,446 | 8/1981 | McLain | 428/377 |
| 4,289,557 | 9/1981 | Stanwood et al. | 156/171 |
| 4,299,884 | 11/1981 | Payen | 428/377 |
| 4,329,193 | 5/1982 | Sznopek et al. | 156/162 |
| 4,381,960 | 5/1983 | Pinter et al. | 428/377 |

Primary Examiner—James J. Bell
Attorney, Agent, or Firm—Eugene O. Heberer

[57] ABSTRACT

A composite base structure (70) and end fitting (26) are secured together by a composite joint to form a graphite-epoxy composite nacelle diagonal strut (20). The elongated base structure (70) has a wall (72) formed of a cured epoxy reinforced with layers of graphite fibers (100, 102, 104, 106) extending in elongated and transverse directions. The layers of fibers in the elongated direction (100, 104) and transverse direction (102, 106) extend onto a large diameter end (52) of a conical end portion (46) of an end fitting (26) and terminate on the conical portion adjacent a small diameter end (60). The layers of the elongated and transverse fibers (100, 102, 104, 106) are intelayered with layers (110, 112, 114, 116, 118) of graphite fibers generally circumferentially wrapped on the conical portion (46), the layers on the conical portion being impregnated with the cured epoxy. At the small diameter end of the conical portion (46) a transverse shoulder (60) extends outwardly and the fibers on the conical portion abut the shoulder.

A method of joining an end fitting (26) to a fiber reinforced base structure (70) includes forming an elongated base structure (70) by applying layers of elongated fibers (100, 104) in the elongated or axial direction and applying layers of fibers (102, 106) in a transverse direction on a removable mandrel (90). The layers of fibers in the elongated and transverse directions are extended onto large diameter end of a conical end portion of an end fitting of large diameter end (52). Layers (110, 112, 114, 116, 118) are circumferentially wrapped on the conical portion so as to be interlayered with the layers of elongated and transverse fibers, the fibers being impregnated with an epoxy, and the epoxy being cured. The mandrel (90) is removed after the epoxy is cured.

23 Claims, 6 Drawing Figures

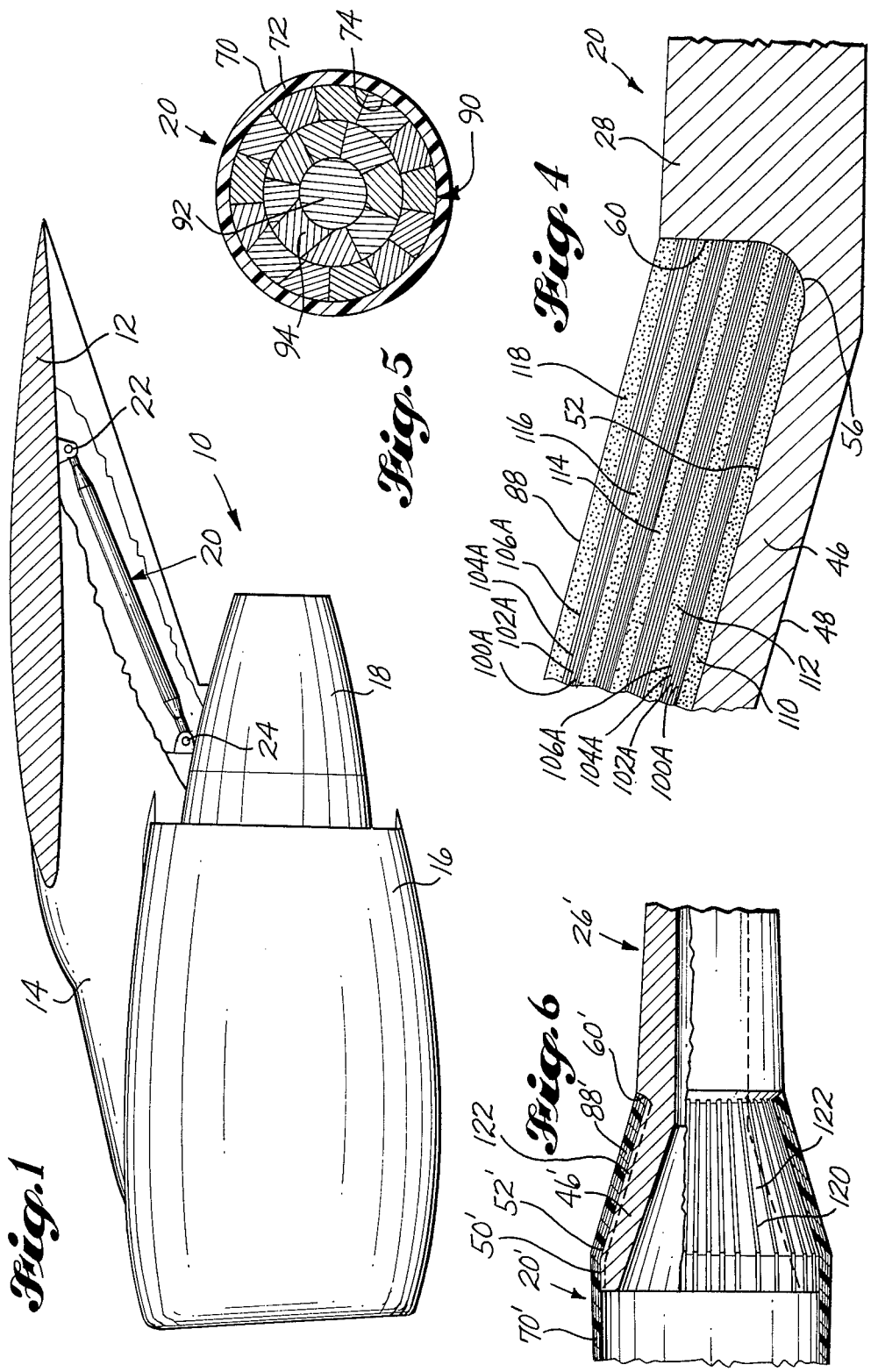

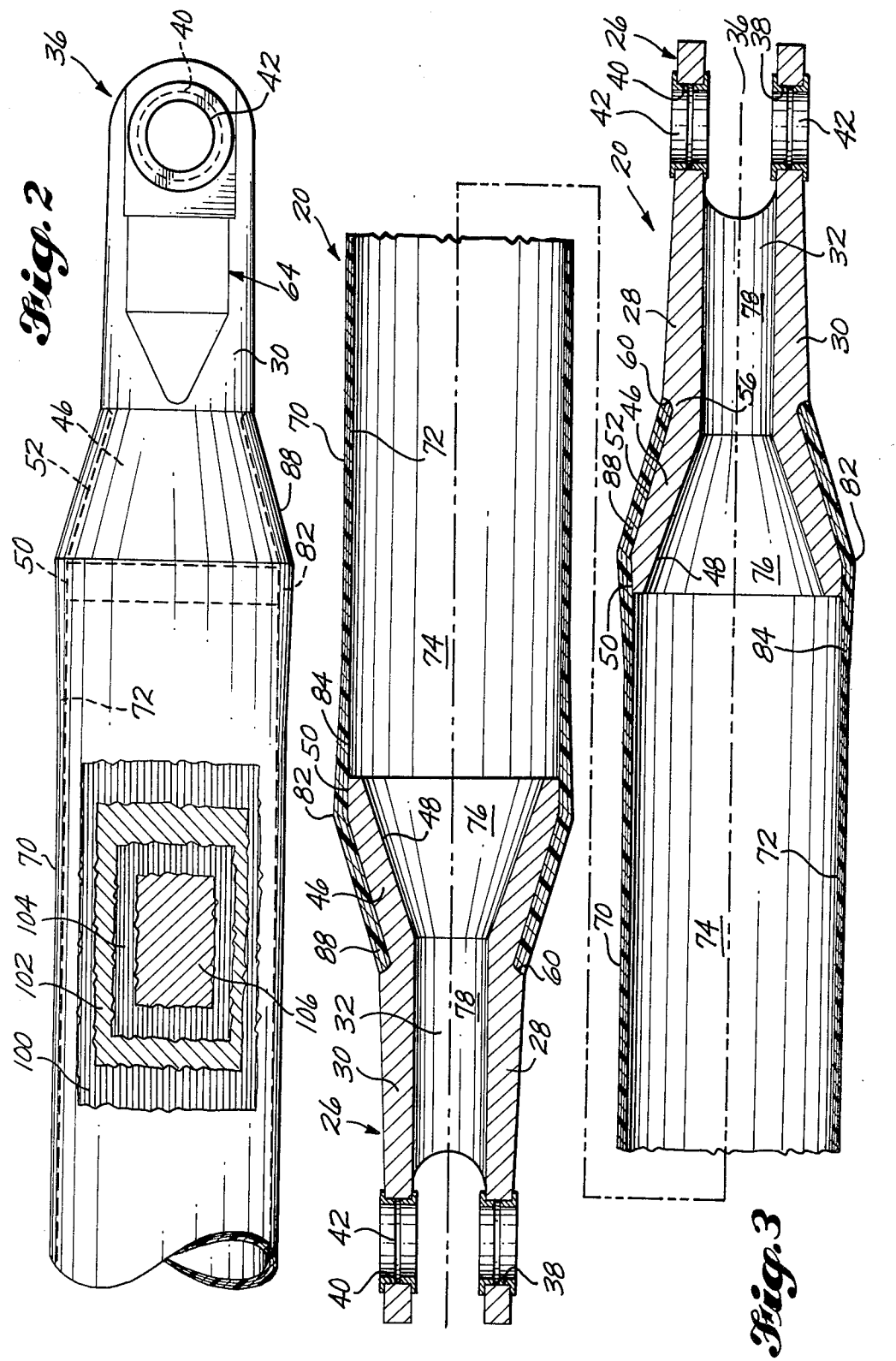

COMPOSITE BASE STRUCTURE AND END FITTING JOINT AND METHOD

DESCRIPTION

1. Technical Field

The invention relates to fiber reinforced composite materials for making strong joints between a composite base structure and an end fitting, which typically may be made of a metal.

2. Background Art

Various schemes have been utilized for the attachment of end fittings of one material to structure parts made of fiber reinforced composite materials. These schemes have involved mechanical attachments such as bolts, rivets, and screw threading. They have been found to be mechanically inefficient, and therefore heavy and/or prone to early failure due to stress concentrations and poor load carrying paths in the attachment region or joint.

A search of the patent literature discloses various composite structures. U.S. Pat. No. 4,260,332 illustrates an integrally wound filament and resin composite spar of a predetermined wall thickness, a fitting integrally wound therein, the fitting defining a rotational hub fastening structure, including a plug having a mechnical engagement groove circumferentially of its longitudinal axis to which the opposing spar wall portion is deflected responsive to winding fabrication of the spar wall on the fitting. Belts are provided opposite the groove locally peripherally confining the deflected spar wall portion in mechanical engagement reinforcing relation against dislodgement of the spar wall portion from the plug groove.

U.S. Pat. No. 3,881,973 discloses a structural joint for connecting a first member of composite material to a second member which may be of composite material or of some other material. The first member is positioned in end-to-end relationship with a second member such that a plurality of ends of first fiber material integral with the first member and extending beyond its end overlies the outer surface of the second member. The outer surface of the second member is contoured to a shape having a central portion of minimal cross-sectional area bounded by opposing portions of greater cross-sectional areas. Other fiber material is then wrapped around the first fiber material together with an appropriate resin in a direction transverse to the axes of the first and second members such that the ends of the first fiber material conform to the contour of the outer surface of the second member and are held fast to the second member.

U.S. Pat. No. 3,115,271 discloses a cone-shaped structure comprised of a wide, flat strip of non-woven, aligned filaments or fibers, which strip extends spirally about the axis of the structure with each convolution of the strip overlapping the preceding convolution. The fibers are embedded in hard resinous material which bonds the fibers to adjacent fibers and to fibers of successive convolutions. A wide flat strip of non-woven, longitudinally-aligned fibers impregnated with a fusable resin may be applied spirally to a cone-shaped mandrel in the direction from the apex toward the base, with each convolution overlapping the preceding convolution and with the overlapped portion of each convolution contacting the surface of the mandrel.

The following patents disclose other fiberous and resin structures:
U.S. Pat. No. 2,837,456
U.S. Pat. No. 3,272,672
U.S. Pat. No. 3,850,722
U.S. Pat. No. 3,992,237
U.S. Pat. No. 4,187,135
U.S. Pat. No. 4,211,589
U.S. Pat. No. 4,234,368
U.S. Pat. No. 4,236,386
U.S. Pat. No. 4,238,540
U.S. Pat. No. 4,289,557
U.S. Pat. No. 4,329,193

DISCLOSURE OF THE INVENTION

The invention is a joint for securing a base structure made of fiber reinforced composite materials to an end fitting of the same or some other material, and a method for making the same. The composite materials are comprised of fibers or tows such as graphite, boron, or straight carbon which can be oriented in any direction, and in varying directions, and a matrix material such as epoxy which bonds the fibers into a solid useful form.

An elongated base structure such as a tube has a wall formed of a cured epoxy reinforced with layers of fibers extending in an elongated axial direction and in a transverse direction, with the transverse direction being generally 45° to the elongated direction and the transverse fibers being arranged to cross at approximately 90° to each other. The layers of fibers in the elongated and transverse directions extend onto a large diameter end of a conical end of an end fitting so as to terminate substantially adjacent a small diameter end of the cone portion. The layers of the elongated and transverse fibers are interlayered with layers of fibers which are generally circumferentially wrapped on the cone portion. The layers on the cone portion are also impregnated with a cured epoxy.

A transverse shoulder extends generally radially outwardly from a small diameter end of the cone portion and the fibers on the cone abut the shoulder.

A plurality of layers of the elongated and transverse fibers are alternated with a plurality of layers of circumferentially wrapped fibers on the cone, the inner and outer plurality of layers being circumferentially wrapped and the plurality of layers therebetween are elongated and transverse, alternated with circumferentially wrapped layers. The number of layers in each plurality of layers of elongated and transverse layers on the base structure are greater than on the conical portion. Each plurality of elongated and transverse layers has a plurality of elongated fibers and a plurality of transverse fibers.

Where the structure is limited to tensile or pull apart forces applied axially to end fittings at both ends of a base structure, the forces are resisted by hoop tension in the circumferentially oriented composite material structure formed by the layers on the cone portion. In the formation of the base structure or tubular member, elongated layers for tensile and pull apart forces have been found to properly be comprised of 64% of elongated or axially directed tows or fibers, and the transverse layers have been found to be properly about 36% of tows at plus or minus 45° to the axial direction.

Where torsional or twisting forces are to be resisted in the joint, serrations, alternate lands and grooves, or other axially directed irregularities are formed in the cone and shoulder surfaces of the end fittings. The fibers are embedded in the lowered surfaces provided by the foregoing.

The method is comprised of forming an elongated base structure or tubular member by applying layers of elongated fibers in an axial direction and applying layers of fibers in a transverse direction on a removable mandrel. The layers of fibers in the elongated and transverse directions are extended onto a large diameter end of a conical end portion of an end fitting to terminate substantially adjacent a small diameter end of a conical portion. Circumferentially wrapped layers of fibers are wound on the conical portion so as to be interlayered with layers of the elongated and transverse fibers. The fibers are either pre-impregnated or are impregnated with an epoxy during or after the fibers are wrapped and positioned. The epoxy is then cured.

The mandrel is such that it is removed after the epoxy is cured. It may be made of a numerous pieces which form an outer cylindrical surface, the pieces having a central core which can be removed through the end fittings. Thereafter each piece can be removed separately as it is loosened within the finished structure. The mandrel can also be made of hard salt brick, or a plaster which can be dissolved out of the finished structure, or it can be made of a lightweight rigid cellular form which is light enough to be left in the structure. If it is not light enough to be left in, it can be dissolved to be removed.

The fibers may be individual strands, braids, or in the form of tape or cloth.

A particular advantage of such structure is that directional strength can be applied as needed by increasing the wrappings or windings for additional strength, and where less strength is required, fewer fibers can be used to complete the structure.

Weight analysis of the invention in the form of a nacelle diagonal strut shows that the weight saving is in the range of 30 to 35%, or about 96 pounds weight reduction in a large airplane. Similar struts may be used in a variety of places throughout an airplane.

Further advantages of the invention may be brought out in the following part of the specification wherein details have been described for competence of the disclosure, without intending to limit the scope of the invention which is set forth in the appended claims.

BRIEF DESCRIPTION OF THE DRAWINGS

Referring to the accompanying drawings which are for illustrative purposes:

FIG. 1 is a fragmentary side elevational view of an airplane having a jet engine and nacelle secured under the wing and being supported by a diagonal strut for receiving tensile or compressive forces applied axially to the end fittings of the strut;

FIG. 2 is a side elevational fragmentary view of a composite strut illustrating fiber arrangements on a tubular base structure;

FIG. 3 is an interrupted cross-sectional view of a strut according to the invention;

FIG. 4 is a fragmentary cross-sectional view of a conical portion on a end fitting illustrating the windings of the epoxy impregnated fibers thereon;

FIG. 5 is a cross-sectional end view of a tubular base structure, illustrating a type of removable mandrel used in the formation of the structure; and FIG. 6 is a fragmentary view of an end fitting having axially directed lands and grooves in a conical end to be used in a strut for resisting torsional or twisting forces.

BEST MODE FOR CARRYING OUT THE INVENTION

Referring again to the drawings, there is shown in FIG. 1 an airplane, generally designated as 10, having a wing 12 and secured thereto is a pylon 14 which in turn supports a jet engine nacelle 16 and an engine exhaust cone 18. Additional support is provided to the engine and nacelle by a nacelle drag strut 20, having one end pivotally engaged at 22 to the wing and having the other end pivotally engaged at 24 to the pylon 14. When the engine is exhausting rearwardly, the strut 20 supports the engine and nacelle on the aircraft and its tensile or pull apart forces are applied axially to the end fittings. When the thrust is reversed compressive forces are applied axially through the end fittings and strut.

In FIG. 3 the strut 20 is shown in cross-section. The strut has two identical end fittings 26, having sidewalls or attachment lugs 28 and 30, joined by a channel base 32. Axially outwardly of the base 32, a space 36 is open. Adjacent the outer ends are aligned pivot pin holes 38 and 40, each having a pair of bearing sleeves 42 therein. The pivot pins at 22 and 24, FIG. 1, are adapted to extend through the sleeves 42 to secure the strut on the airplane.

At the inner end of the lugs 28 and 30, the end fitting has a frusto-conical cone 46. The cone 46 at its inner surface 48 is conical for the full length of the cone but the outer surface terminates in a cylindrical surface 50 at the inner end. Outwardly of the outer surface 50, the outer conical surface 52 terminates in an inner small diameter end 56 in a generally radial, outwardly extending annular shoulder 60. The depth of the shoulder may be as deep as required by the compression load on the strut. As shown in FIG. 2, the wall 30, identical to the wall 28 not shown, has cut away portions, generally designated as 64, for lightening and for fitting on the pivots.

Inwardly of the end fittings is a tubular, generally cylindrical portion 70 having a wall 72 and a cylindrical open passage 74 in communication with a conical passage 76 in the end fittings with the latter being joined by an axial end passage 78 in each of the end fittings.

The wall 70 increases in thickness as it extends outwardly to the cylindrical surface 50 on the end fittings 26, where it has its maximum thickness 82, about twice that of the tubular portion 70. The generally tubular wall tapers as at 84 for a short distance until the wall is narrowed to its minimum thickness. Outwardly of the area 82 a conical wall 88 extends over wall 46 and its surface 52 to terminate in abutment with the annular shoulders 60 on both of the end fittings.

The tubular portion 70, the wall portions 82 and 88 are formed of composite material, such as an epoxy reinforced with graphite fibers. The wall 70 is formed on a mandrel 90, FIG. 5, having a generally cylindrical outer surface and made of many parts formed around a cylindrical core 92 which may be removed through the passages 76 and 78 of the end fittings when the strut 20 has been completed. When the core 92 is removed an elongated member such as 94 may next be removed. After the removal of the member 94 each of the pieces may be removed as convenient. Other types of mandrels could be used as indicated above.

When the mandrel is positioned between the end fittings 26 for applying the composite material thereto either by hand or by machine, the composite material fibers may be applied to the mandrel in individual fibers, in cloth or tape made from the fibers, in dry form or pre-impregnated, or impregnated during the operation or after the operation has been completed. The fibers are applied or wrapped on the mandrel and end fittings as needed to obtain the required mechanical properties of strength, stiffness, and directivity.

Examples of fibers applied to or wrapped or braided on the tubular portion 70 are shown in FIG. 2. An inner fiber layer is formed of graphite woven in a cloth form 100. Such a layer may be in multiples, may be of a single layer, and for the most part layers on the mandrel to form the tubular portion 70 are extended onto the conical surface 52 of the end fittings and into abutment with the shoulders 60. The second layer 102 has been wrapped transversely at about 45°, for example, to the elongated axially directed fibers in the cloth 100. The layer 102 is also extended to the shoulders 60. A third layer 104 is shown, by way of example, formed of individual graphite fibers and is also adapted to extend to the opposite shoulders 60. The fourth example is shown by the transversely wrapped layer 106. This layer is also wrapped at approximately 45° with the elongated layers 100, 104 and about 90° with the layer 102. Typically, two transverse layers, or more, are wound on top of one other so as to have continuous contact rather than being spaced by a layer 104 therebetween. Transverse layers may be braided or wound at any convenient angle and may be produced either by machine or by hand layup.

The fibers 100, 102, 104, and 106 are extended in a planned sequence of layers over the conical surfaces 52 on the end fittings, substantially as indicated in FIG. 4. Thus, layers indicated as 100A, 102A, 104A, and 106A each represent a plurality of layers of elongated and transverse layers of fibers in the numbers and directions required for the structure being made. As they are positioned on the conical surfaces, they are interlayered or intermixed with layers of circumferentially wrapped reinforcement fibers, indicated generally by the layers 110, 112, 114, 116, and 118, each layer 100A, 102A, 104A, and 106A representing a plurality of layers of fibers which may be in any of the other forms hereinbefore mentioned. Inner layer 110 and the outer layer 118 on the conical surfaces are shown to be circumferentially wrapped to add better reinforcement to the structure. In between the outer and inner layers, elongated axially directed and transverse layers extending on the tubular portion 70 are alternated with the substantially circumferentially wrapped layers 112, 114, and 116.

The forming of the tapers at 82 on the cylindrical surfaces 50 of the end fittings are the result of the extensions of the wrapping beyond the conical surfaces onto the tubular surfaces. The wrapping terminates at the end of the tapers in uniform transitions inboard of the end fittings, the circumferential reinforcement being needed only around the end fittings.

If the fibers are applied in the un-impregnated form then a matrix or bonding material may be applied to the fiber layers during the manufacturing process. In either method, the matrix material is suitably treated by well-known methods in the presence of radial squeezing pressure to cure the composite portions on the tubular member 70 and on the end fittings into a solid structure. Many usable epoxies may be cured at room temperature but are heated to expedite the curing at well-known temperatures for well-known periods of time.

After cure, the end fittings are firmly secured by composite material extending from the tubular member to the conical portions 88, in abutment with the shoulders 60. The fibers and epoxy need not be adhesively bonded to the end fittings.

Tensile or pull apart forces applied axially to the end fittings 26 of the assembly and of the joint are resisted by hoop tension in the circumferentially composite material formed by the layers 110, 112, 114, 116, and 118. These layers prevent spreading action caused by the end fittings trying to pull out of the composite material structure. Compressive forces applied axially to the end fittings are transmitted in bearing from the shoulder 60 to the layered composite material structure comprising all the layers on the conical surface 52 which mate with the shoulders.

An example of a graphite-epoxy composite nacelle diagonal strut 20 for a large airplane was made according to the invention as follows. The overall length was about 112 inches and the internal diameter of the tubular portion 70 was about 6½ inches and the wall thickness at 70 was about ¼ inch. The axial length of the conical surface 52 was about 4½ inches and the tapered length at 84 was about 2½ inches. The thickness of conical fiber walls 88 was about ½ inch, the radial length of the shoulders 60. Four braided passes of 11 layers each formed the wall of the tubular portion 70 and of these passes 64% (7 passes) were axial tows and 36% (4 passes) were transverse tows at about 45° to the axial tows, to provide a total of 44 layers. There were five circumferential wrapping layers of 14 graphite-epoxy layers each, FIG. 4; they were alternated with four braided passes extending from the tubular portion 70. The axial layers from the tubular portion were reduced from 7 to 4 per pass on the conical area. The ratios and directions of fibers are variable, depending upon loading, cost, and manufacturing requirements.

The graphite fibers used had a volume ratio of 0.60; the average layer thickness was 0.00525 inch, the density was 0.055 pound per cubic inch; the maximum operating temperature was designed to be 350° F.;, the compression allowable was 45,000 psi. on the tubular portion 70; and the tension allowable was 47,000 psi. on the circumferentially reinforced joined ends. The maximum axial forces on the strut 20 is calculated to be between 50,000 and 60,000 pounds and the strut was tested to survive 120,000 pounds, the factor of safety being 1.25.

Torsional or twisting forces can be resisted by serrations, alternate lands and grooves, or other axial irregularities formed in the conical and shoulder surfaces 46' and 60' in FIG. 6. The structures indicated with a prime mark on the numeral are substantially identical to those shown in the other figures, but here the surfaces 50', 52' and 60' have alternate axial lands and grooves 120 and 122 respectively. The lands and grooves in the cylindrical portion 50' are not strictly necessary. The fibers extending over the lands and grooves are embedded therein when the epoxy is cured, and the composite material is held in place against torsional or twisting forces.

The invention and its attendant advantages will be understood from the foregoing description and it will be apparent that various changes may be made in the form, construction, and arrangements of the parts of the invention without departing from the spirit and scope thereof or sacrificing its material advantages, the arrangement hereinbefore described being merely by way of example. I do not wish to be restricted to the specific forms shown or uses mentioned except as defined in the accompanying claims.

What is claimed is:

1. A base structure and end fitting having a strong joint in which the base structure and joining structures are made from fiber reinforced material, comprising:

an elongated base structure having a wall formed of a cured epoxy reinforced with layers of fibers extending in an elongated direction and in a transverse direction;

layers of said fibers in the elongated direction and transverse direction of said wall extending onto a large diameter end of a conical end portion of an end fitting and on the conical portion to terminate substantially adjacent a small diameter portion of the conical portion;

layers of said elongated and transverse fibers being interlayered with layers of fibers generally circumferentially wrapped on said conical portion; tensile or pull apart forces applied axially to the end fitting being resisted by hoop tension in the circumferentially wrapped fibers;

said layers on said conical portion being impregnated with a cured epoxy; and an annular transverse shoulder extends outwardly from adjacent a small diameter end of the conical portion;

fibers on said conical portion abutting the shoulder, the shoulder being adapted to receive compression forces in the fibers.

2. The invention according to claim 1 in which: the number and/or direction of layers at any part of the total structure is determined by the strength required at the part.

3. The invention according to claim 1 in which: the elongated and transverse fibers are in individual form and cloth form.

4. The invention according to claim 1 in which: the layers on the conical portion have a total thickness substantially greater than the layers on the base structure;

layers of the circumferentially wrapped fibers extend onto the base structure, adjacent the large diameter end of the conical portion, in a taper.

5. The invention according to claim 1 in which: a plurality of layers of elongated and transverse fibers are alternated with a plurality of layers of circumferentially wrapped fibers on said conical portion;

the inner and outer plurality of layers being circumferentially wrapped and the plurality of layers therebetween being elongated and transverse alternated with other of the circumferentially wrapped layers;

the number of layers in each plurality of layers of elongated and transverse layers on the base structure being greater than on the conical portion.

6. The invention according to claim 5 in which: each plurality of layers of elongated and transverse layers have a plurality of elongated fibers and a plurality of transverse fibers, the percentage of elongated fibers being 64% and the percentage of transverse fibers being 36%.

7. The invention according to claim 6 in which: said elongated base structure being a generally tubular member formed of said wall;

said member having two ends and said layers of said fibers in the elongated and transverse directions at both of said ends extending onto a said large diameter end of a conical end portion of an end fitting;

the elongated and transverse layers being secured to the end fittings by said circumferentially wrapped fibers and said cured epoxy.

8. The invention according to claim 7 in which: each of said end fittings has an outer end portion adapted to be secured for support purposes, whereby the base structure and end fittings provide a strong support.

9. The invention according to claim 1 in which: said conical end portion and shoulder have axially directed lowered portions in their surfaces in which fibers are embedded to resist torsional and/or twisting forces on the base structure and end fitting.

10. The invention according to claim 1 in which: said conical end portion and shoulder have axially directed alternate lands and grooves in their surfaces in which fibers are embedded to resist torsional and/or twisting forces on the base structure and end fitting.

11. The invention according to claim 6 in which: the transverse fibers are at angles of approximately plus or minus 45° with the elongated fibers, crossing layers at said 45° being approximately at 90° to each other.

12. A method of joining an end fitting to a fiber reinforced base structure, comprising:

forming an elongated base structure having a generally cylindrical wall by applying layers of elongated fibers in an elongated direction and applying layers of fibers in a transverse direction on a mandrel;

extending layers of the fibers in the elongated and transverse directions onto a large diameter end of a conical end portion of an end fitting and on the conical portion to terminate substantially adjacent a small diameter portion of the conical portion;

said end fitting having a generally radially directed shoulder adjacent a small diameter end of the conical portion;

positioning the layers of fibers on the conical portion so that they abut the shoulder;

circumferentially wrapping layers of fibers on the conical portion so as to be interlayered with layers of the elongated and transverse fibers;

said fibers being impregnated with an epoxy; and curing the epoxy.

13. A method according to claim 12 including:

fixing the strength of any part of the structure including a joint by varying the number and/or the direction of the layers.

14. A method according to claim 12 including:

said mandrel being removable;

removing the mandrel after the epoxy is cured.

15. A method according to claim 12 including:

applying layers of fibers on the conical portion so that those on the conical portion are substantially thicker than the layers on the base structure;

circumferentially wrapping fibers adjacent the large diameter end of the conical portion to extend on the base structure in a taper.

16. A method according to claim 12 including:

alternating a plurality of layers of elongated and transverse fibers with a plurality of layers of circumferentially wrapped fibers on the conical portion;

arranging inner and outer plurality of layers to be circumferentially wrapped;

alternating the elongated and transverse layers with other of the circumferentially wrapped layers between the inner and outer layers; and applying the number of layers in each plurality of layers of elongated and transverse layers on the base structure to be greater than on the conical portion.

17. A method according to claim 16 in which:

each plurality of layers of elongated and transverse layers has a plurality of elongated fibers and a plurality of transverse fibers, the percentage of elongated fibers being 64% and the percentage of transverse fibers being 36%.

18. A method according to claim 17 in which:

the mandrel is substantially cylindrical so that the elongated base structure formed thereon is substantially tubular;

forming the tubular base structure to have two ends having said layers in the elongated and transverse directions extending onto a said large diameter end of a conical end portion of an end fitting;

the elongated and transverse layers being secured to the end fittings by said circumferentially wrapped fibers and curing the epoxy.

19. A method according to claim 18 in which:

each of said end fittings has an outer end portion adapted to be secured for support purposes, whereby the base structure and end fittings provide a strong support.

20. A method according to claim 13 in which:

said conical end portion and shoulder have axially directed lower portions in their surfaces in which fibers are embedded to resist torsional and/or twisting forces on the base structure and end fitting.

21. A method according to claim 13 in which:

said conical end portion and shoulder have axially directed alternate lands and grooves in their surfaces in which fibers are embedded to resist torsional and/or twisting forces on the base structure and end fitting.

22. A method according to claim 16 including:

applying the transverse fibers at angles of approximately plus or minus 45° with elongated fibers, the crossing transverse fibers at said 45° being approximately at 90° to each other.

23. A method according to claim 22 in which:

the various fibers may be in the form of individual fibers, tape, or cloth.

* * * * *